US 8,818,936 B1

(12) United States Patent
Haase et al.

(10) Patent No.: US 8,818,936 B1
(45) Date of Patent: Aug. 26, 2014

(54) METHODS, SYSTEMS, AND COMPUTER PROGRAM PRODUCTS FOR PROCESSING READ REQUESTS RECEIVED DURING A PROTECTED RESTORE OPERATION

(75) Inventors: David Haase, Fuquay Varina, NC (US); Somnath A. Gulve, Morrisville, NC (US); Saurabh M. Pathak, Chapel Hill, NC (US)

(73) Assignee: EMC Corporation, Hopkinton, MA (US)

( * ) Notice: Subject to any disclaimer, the term of this patent is extended or adjusted under 35 U.S.C. 154(b) by 852 days.

(21) Appl. No.: 11/823,986

(22) Filed: Jun. 29, 2007

(51) Int. Cl.
G06F 7/00 (2006.01)
G06F 17/30 (2006.01)

(52) U.S. Cl.
USPC .......................................... 707/610; 707/704

(58) Field of Classification Search
USPC ......................................................... 707/609
See application file for complete search history.

(56) References Cited

U.S. PATENT DOCUMENTS

| | | | |
|---|---|---|---|
| 5,455,932 A | 10/1995 | Major et al. | |
| 5,522,037 A | 5/1996 | Kitagawa et al. | |
| 5,592,618 A | 1/1997 | Micka et al. | |
| 5,742,792 A | 4/1998 | Yanai et al. | |
| 6,532,551 B1 | 3/2003 | Kamei et al. | |
| 6,662,268 B1 | 12/2003 | McBrearty et al. | |
| 6,898,681 B2 | 5/2005 | Young | |
| 6,910,111 B1 | 6/2005 | Colgrove et al. | |
| 7,096,331 B1 * | 8/2006 | Haase et al. | 711/162 |
| 7,133,985 B1 * | 11/2006 | Haase et al. | 711/162 |
| 7,165,155 B1 * | 1/2007 | Duprey et al. | 711/162 |
| 7,188,223 B1 * | 3/2007 | Haase et al. | 711/162 |
| 7,353,351 B1 | 4/2008 | Haase et al. | |
| 7,461,100 B2 * | 12/2008 | Spear et al. | 1/1 |
| 7,539,828 B2 * | 5/2009 | Lomnes | 711/163 |
| 7,596,672 B1 * | 9/2009 | Gole et al. | 711/170 |
| 2003/0051109 A1 | 3/2003 | Cochran | |
| 2003/0069903 A1 * | 4/2003 | Gupta et al. | 707/204 |
| 2003/0115432 A1 | 6/2003 | Biessener et al. | |
| 2003/0177322 A1 | 9/2003 | Crockett et al. | |
| 2003/0204510 A1 | 10/2003 | Ball et al. | |
| 2004/0030951 A1 * | 2/2004 | Armangau | 714/6 |
| 2004/0148477 A1 * | 7/2004 | Cochran | 711/162 |
| 2004/0260873 A1 * | 12/2004 | Watanabe | 711/114 |
| 2004/0267822 A1 | 12/2004 | Curran et al. | |
| 2005/0182910 A1 * | 8/2005 | Stager et al. | 711/162 |

(Continued)

OTHER PUBLICATIONS

Commonly-assigned co-pending U.S. Appl. No. 12/544,046 for "Systems, Methods, and Computer Readable Media for Copy-on-Demand Optimization for Large Writes," (Unpublished, filed Aug. 19, 2009).

(Continued)

Primary Examiner — Robert Beausoliel, Jr.
Assistant Examiner — Michael Pham
(74) Attorney, Agent, or Firm — Jenkins, Wilson, Taylor & Hunt, P.A.

(57) ABSTRACT

According to one aspect, the subject matter described herein includes a method for processing read requests received during a restore operation, where a protected restore operation includes copying at least a portion of the data content of the clone to its source. The method includes receiving a read request to read data from a source during a protected restore operation. It is determined whether to redirect the read request to the clone, and in response to determining to redirect the read request to the clone, the read request is redirected to read data from the clone.

17 Claims, 6 Drawing Sheets

(56) References Cited

U.S. PATENT DOCUMENTS

| | | | |
|---|---|---|---|
| 2006/0075200 A1* | 4/2006 | Satoyama et al. | 711/162 |
| 2006/0173935 A1* | 8/2006 | Merchant et al. | 707/204 |
| 2007/0185924 A1* | 8/2007 | Kawamura | 707/202 |
| 2007/0198612 A1* | 8/2007 | Prahlad et al. | 707/204 |
| 2007/0288711 A1* | 12/2007 | Chen et al. | 711/162 |

OTHER PUBLICATIONS

Final Official Action for U.S. Appl. No. 12/544,046 (May 7, 2012).
Non-Final Official Action for U.S. Appl. No. 12/544,046 (Oct. 25, 2011).
Advisory Action Before the Filing of an Appeal Brief for U.S. Appl. No. 12/544,046 (Sep. 20, 2012).
Applicant-Initiated Interview Summary for U.S. Appl. No. 12/544,046 (Oct. 16, 2012).
Notice of Allowance and Fee(s) Due for U.S. Appl. No. 10/679,726 (Dec. 19, 2007).
Advisory Action for U.S. Appl. No. 10/679,726 (Oct. 17, 2007).
Final Official Action for U.S. Appl. No. 10/679,726 (Jun. 4, 2007).
Interview Summary for U.S. Appl. No. 10/679,726 (Nov. 2, 2006).
Non-Final Official Action for U.S. Appl. No. 10/679,726 (Nov. 2, 2006).
Notice of Allowance and Fee(s) Due for U.S. Appl. No. 10/679,662 (Sep. 29, 2006).
Advisory Action for U.S. Appl. No. 10/679,726 (Sep. 19, 2006).
Advisory Action for U.S. Appl. No. 10/679,726 (Aug. 15, 2006).
Interview Summary for U.S. Appl. No. 10/679,662 (Aug. 15, 2006).
Advisory Action for U.S. Appl. No. 10/679,662 (Jul. 3, 2006).
Final Official Action for U.S. Appl. No. 10/679,662 (Apr. 13, 2006).
Final Official Action for U.S. Appl. No. 10/679,726 (Apr. 13, 2006).
Notice of Allowance and Fee(s) Due for U.S. Appl. No. 10/673,722 (Apr. 6, 2006).
Notice of Allowance and Fee(s) Due for U.S. Appl. No. 10/673,864 (Mar. 21, 2006).
Non-Final Official Action for U.S. Appl. No. 10/673,722 (Dec. 2, 2005).
Non-Final Official Action for U.S. Appl. No. 10/679,726 (Oct. 20, 2005).
Non-Final Official Action for U.S. Appl. No. 10/673,864 (Oct. 20, 2005).
Non-Final Official Action for U.S. Appl. No. 10/679,662 (Oct. 7, 2005).

* cited by examiner

METHODS, SYSTEMS, AND COMPUTER PROGRAM PRODUCTS FOR PROCESSING READ REQUESTS RECEIVED DURING A PROTECTED RESTORE OPERATION

TECHNICAL FIELD

The subject matter described herein relates to processing read requests in a data storage environment. More particularly, the subject matter described herein relates to methods, systems, and computer program products for processing read requests received during a protected restore operation.

BACKGROUND

In data storage systems, it may be desirable to store multiple copies of data in one or more locations. For example, a data storage system may include a first data storage location that stores original data (hereinafter referred to as a "source") and one or more copies of the data (hereinafter referred to as "clones"). For example, an organization may continuously copy data so that copies of the data are maintained in at least two places for subsequent retrieval operations.

The process of copying data from the source to a clone is referred to as mirroring. As changes are made to the source, the changes are replicated to the clone. Thus, a clone continuously represents an up-to-date point-in-time copy of the source.

It may be desirable to restore source data using clone data. The process of copying data from a clone to a source is referred to as a reverse sync operation. During a reverse sync operation, requests to write data to the source (hereinafter referred to as "write requests") may continue to be received and processed, where processing a write request received during a reverse sync includes writing the requested data to the source and replicating the change to the clone. Because changes resulting from received write requests are automatically replicated to the clone during a reverse sync operation, the clone being copied from may continue to be updated during the reverse sync. While a reverse sync performed while updating a clone ensures that a clone accurately represents the most recent point-in-time copy of its source, it does not allow the user to restore the source to a snapshot of the source as it existed at an arbitrary point in the past, because the clone data can be overwritten with new data.

Because a user may wish to cease automatic mirroring of changes to the clone so that the clone may represent a complete point-in-time copy of the source for a specific time in the past, conventional data storage systems provide for logically disconnecting, or fracturing, a clone from its source by discontinuing copying of data from the source to the clone. Upon fracturing, a fractured clone may represent a point-in-time copy of the source at the time it was fractured. Thus, in order to create multiple copies of the source corresponding to multiple points in time, a user may fracture one or more clones at different times. For example, a user operating a data storage system including a source and seven clones may fracture a different clone each day of the week. Therefore, the source may be restored to any day during the previous week by initiating a reverse sync with the appropriate clone.

It may be desirable to restore source data using clone data from a fractured clone. The process of copying data from a fractured clone to a source is referred to as a protected restore operation. During a protected restore operation, data is copied from the clone to the source while changes to the source made as a result of write requests received during the protected restore operation are not replicated to the clone. Therefore, the integrity of the fractured clone is protected during the protected restore operation.

In addition to receiving write requests, read requests may be received during a protected restore operation. However, the processing of read requests received during a protected restore operation may produce undesirable results if the requested data has not yet been copied from the clone back to its source. For example, upon initiating a protected restore operation, the process of copying data from the clone to the source may appear to the user to occur instantly. However, depending on a number of factors, such as the amount of data to be copied and the speed of the physical data storage devices, the process of copying data during a reverse sync may not occur instantly. Instead, a significant amount of time may be required to complete a protected restore operation. Thus, read requests may be received during the execution of a protected restore operation which are directed to data that has not yet been copied back to its source.

One conventional solution for processing read requests received during a protected restore operation includes queuing a read request if it is determined that the requested data is located on the clone (i.e. it has not yet been copied back to the source). In some implementations, this determination may be made by detecting whether the requested data content on the source is different from the corresponding data content on the clone. For example, source and clone data may be divided into one or more contiguous data blocks hereinafter referred to as extents. If the read request is directed to a source extent which differs from the corresponding clone extent, the read request is queued so that the extent may be copied to the source before the data is read from the source.

One problem with the conventional processing of read requests received during a restore operation described above (i.e. queuing read requests) is that as the number of queued read requests increases, the degradation in host read performance also increases. Specifically, in data storage systems where protected restore operations require significant periods of time to complete, the time required to process read requests received during a protected restore operation may be unacceptably long.

Accordingly, a need exists for improved methods, systems, and computer program products for processing read requests received during a protected restore operation.

SUMMARY

According to one aspect, the subject matter described herein includes a method for processing read requests received during a restore operation, where a protected restore operation includes copying at least a portion of the data content of the clone to its source. The method includes receiving a read request to read data from a source during a protected restore operation. It is determined whether to redirect the read request to the clone, and in response to determining to redirect the read request to the clone, the read request is redirected to read data from the clone.

According to another aspect, the subject matter described herein includes a data storage system having a first volume of data denominated as a source and at least a second volume of data denominated as a clone and which has data content that is a copy of data content of the source. The system further includes a read request manager for receiving a read request to read data from the source, for determining whether to redirect the read request to the clone and, in response to determining to redirect the read request to the clone, for redirecting the read request to read data from the clone.

The subject matter described herein for processing read requests received during a protected restore operation may be implemented using a computer program product comprising computer executable instructions embodied in a computer-readable medium. Exemplary computer-readable media suitable for implementing the subject matter described herein include disk memory devices, programmable logic devices, and application specific integrated circuits. In addition, a computer-readable medium that implements the subject matter described herein may be distributed across multiple physical devices and/or computing platforms.

BRIEF DESCRIPTION OF THE DRAWINGS

The subject matter described herein will now be explained with reference to the accompanying drawings of which.

DETAILED DESCRIPTION

Figure 1A:
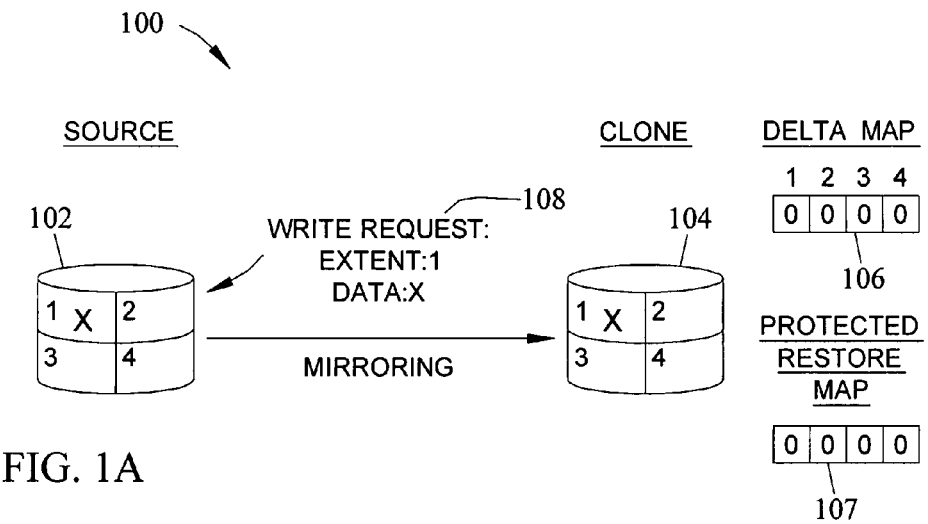
FIGS. 1A-1F are diagrams of different states of an exemplary data storage system for processing read requests received during a protected restore operation according to an embodiment of the subject matter described herein.

FIGS. 1A-1F are diagrams of an exemplary data storage system illustrating an exemplary sequence for processing read requests received during a protected restore operation according to an embodiment of the subject matter described herein. Referring to FIGS. 1A-1F, data storage system 100 may include source 102, clone 104, delta map 106, and protected restore map 107. Source 102 and clone 104 may be stored on one or more physical data storage devices, such as one or more disk storage devices. For example, source 102 and clone 104 may be located on the same or separate disks within a disk array and may be co-located or geographically separated from each other. It is appreciated that while a single clone is shown in the data storage system 100 illustrated in FIGS. 1A-1F, source 102 may be associated with multiple clones without departing from the scope of the subject matter described herein.

In FIGS. 1A-1F, information representing differences between source 102 and clone 104 may be stored in a data structure stored in a computer readable medium, such as random access memory (RAM). For example, delta map 106 may include a bitmap containing one or more bits corresponding to one or more extents in both source 102 and clone 104. Delta map 106 may include a 1 indicating that an extent is different between source 102 and clone 104 or may include a 0 if the data content of the extent is the same between source 102 and clone 104. Similarly, protected restore map 107 may include a bitmap containing bits corresponding to extents of source 102 and clone 104, where protected restore map 107 tracks changes made to source 102 by write requests during a protected restore operation. For example, during a protected restore operation a write request may be received for writing data to source 102. Because delta map 106 may be in use during the protected restore operation, changes to source 102 represented by the received write request may be temporarily tracked by protected restore map 107. In one embodiment, a bit may be set in protected restore map 107 corresponding to the extent to be altered by the write request. Upon writing the requested data to source 102 after the completion of the protected restore operation, protected restore map 107 may then be copied to delta map 106 indicating differences between source 102 and clone 104 and the bits in protected restore map 107 may be cleared.

In the embodiment illustrated in FIG. 1A, source 102 and clone 104 each include four extents for storing data, labeled 1-4. In FIG. 1A, source 102 is mirrored to clone 104, and therefore changes to source 102 are continuously replicated to clone 104. As indicated above, differences between source 102 and clone 104 may be stored, representationally, in delta map 106. Initially, all bits in delta map 106 are set to 0 indicating that no difference initially exists between source 102 and clone 104.

In FIG. 1A, a write request to write data to source 102 is received. Write request 108 indicates a request to write data X to extent number 1 on source 102. Processing write request 108 includes writing data X to extent number 1 on source 102 and replicating the change to extent number 1 on clone 104, because, in this example, it is assumed that mirroring is activated. After data X has been replicated to clone 104, source 102 and clone 104 are the same and therefore no bits are set in delta map 106.

Figure 1B:
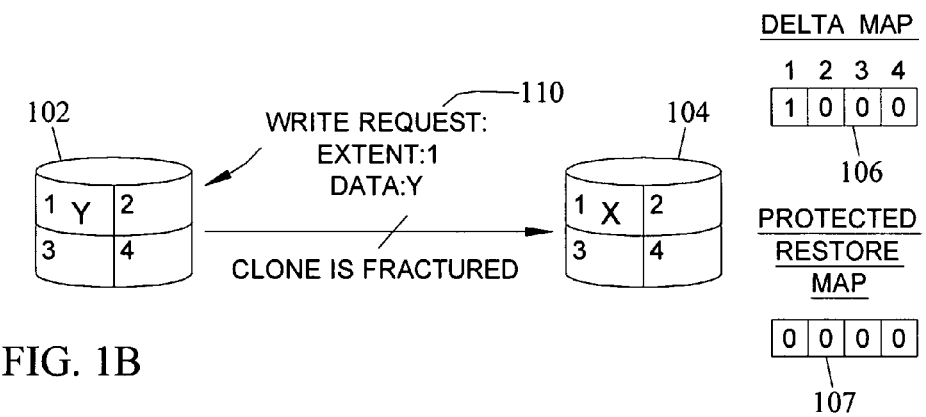

In FIG. 1B, clone 104 is fractured, and therefore data mirroring from source 102 to clone 104 is discontinued. Thus, changes made to source 102 will not be replicated to clone 104 and differences may exist between source 102 and fractured clone 104 as a result of write requests to source 102. For example, write request 110 may be received, where write request 110 requests to write data Y to extent number 1 on source 102. Upon execution of write request 110, extent number 1 on source 102 will contain data Y, and extent number 1 on clone 104 will still contain X. Accordingly, delta map 106 now includes an indication that source 102 and clone 104 are different by setting the first bit in delta map 106 to 1.

Figure 1C:
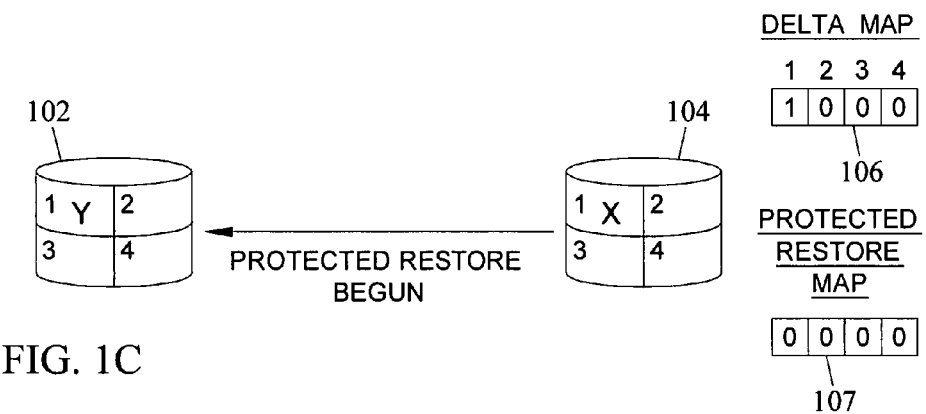

In FIG. 1C, a protected restore operation is initiated between fractured clone 104 and source 102, where the protected restore operation includes copying data X from clone 104 to source 102. During a protected restore operation, delta map 106 may be used to determine the minimum number of extents necessary to copy from the clone to the source. For example, if a bit is set in delta map 106 for a particular extent, then the extent corresponding to that bit is different between the clone and its source and must be copied. As extents are copied from the clone to its source, their corresponding bits are cleared from delta map 106. Only those extents corresponding to non-zero bits in delta map 106 need to be copied in order to synchronize source 102 and clone 104. Accordingly, only extent number 1 is copied from clone 104 to source 102 during the protected restore operation illustrated in FIG. 1C.

Figure 1D:
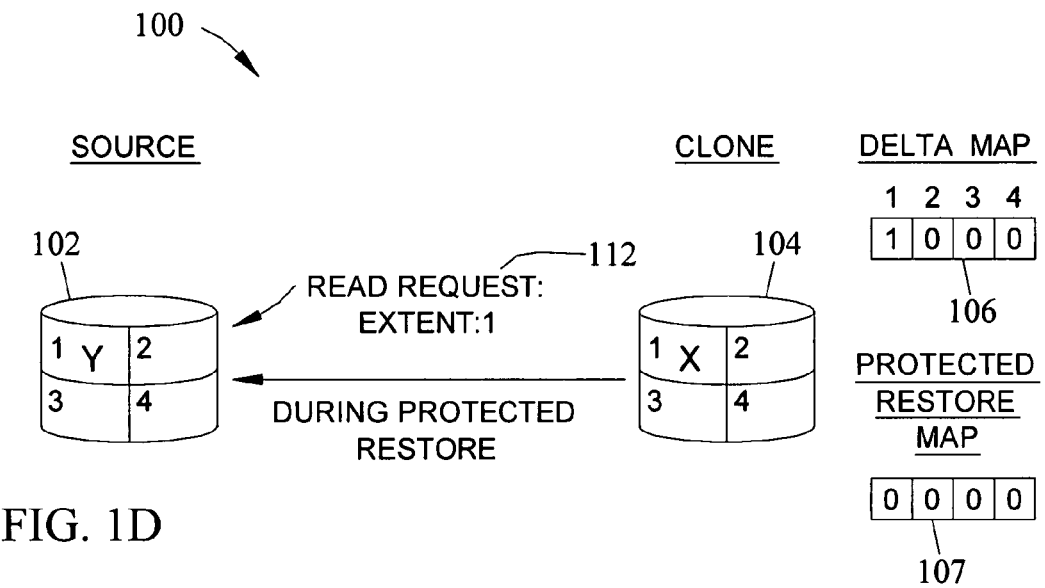

In FIG. 1D, a read request is received during the execution of the protected restore operation described above. For example, read request 112 may be received indicating a request to read data stored at extent number 1 on source 102. In this exemplary scenario, it is appreciated that data X has not yet been copied from clone 104 to source 102 as part of the protected restore operation initiated in FIG. 1C, yet the user perceives the restore operation to have been completed instantaneously. Therefore, the expected result of read request 112 includes data X located on clone 104, and not data Y located on source 102. Because data Y would be returned if read request 112 were immediately executed, conventional data storage systems queue read requests received during a restore operation in order to allow for the requested data to be copied back to the source. However, because the delay associated with queuing read requests is undesirable, the subject matter described herein includes redirecting read request 112 to clone 104.

Figure 1E:
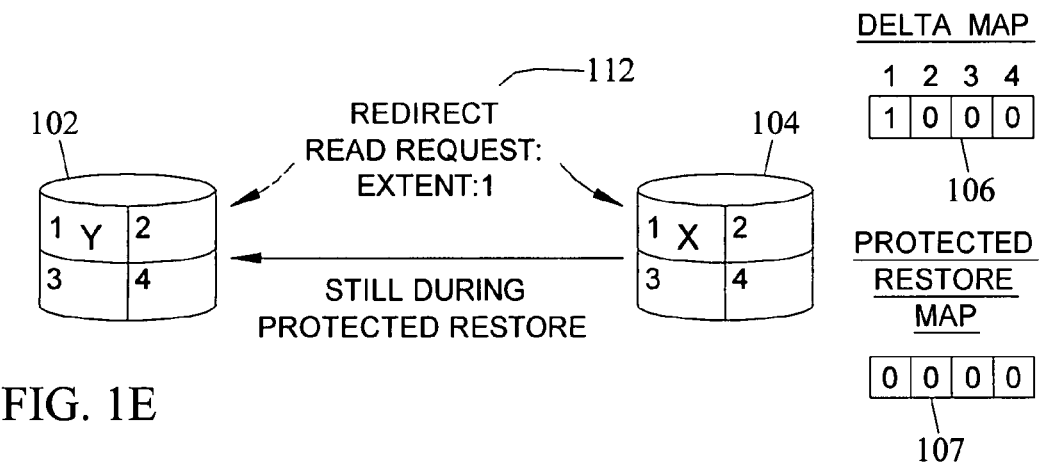

FIG. 1E illustrates redirecting read request 112 to clone 104 for processing. For example, read request 112 may be redirected from source 102 to clone 104 by a redirector object included in the source stack. In an exemplary embodiment, each of source 102 and clone 104 may contain stacks associated with reading data from data storage (hereinafter referred to as the "source read stack" and the "clone read stack"). A stack is a data structure representing a collection of objects where access to objects within the stack may be restricted, for example, by a last-in first-out (LIFO) organizational structure. A stack may be stored in a block of computer memory of configurable size and a particular location, or object, in the stack may be identified by a stack pointer. For example, a stack pointer may always point to the most recently accessed object in the stack. According to the subject matter described herein, the source and clone read stacks may each contain objects for processing read requests. When a read request is received by source 102, the read request may be processed by objects in the stack. It is appreciated that objects within a read stack may call software entities external to the stack, such as software drivers, before passing the read request to the next object in the stack. It is further appreciated that at least one object in each of the source and clone read stacks may be configured to read data from source 102 or clone 104, respectively. For example, a data retrieval object may communicate with a driver capable of reading data from a variety of disk formats and disk array configurations, including a redundant array of inexpensive disks (RAID). However, other embodiments for reading data from source 102 and clone 104 may be used without departing from the scope of the subject matter described herein.

In one embodiment of a source read stack, a redirector object may, upon determining to redirect a received read request to clone 104, pass the read request to a data retrieval object located in the clone stack. For example, a redirector object may call a software entity configured to determine whether to redirect read request 112, and if read request 112 is to be redirected, the redirector object may pass read request 112 to a data retrieval object in the clone stack and the requested data is read from clone 104.

In some scenarios, it may be determined that redirection of read request 112 is not desired. For example, if a write request is received during a protected restore operation, the user may expect the result of any subsequently issued read request to retrieve the data written by the write request, and not data located on the clone that would be returned if the read request were redirected. Therefore, in addition to delta map 106, protected restore map 107 may be examined in order to determine whether to redirect a read request received during a protected restore operation.

As described above, during a protected restore operation, a representation of changes to source 102 that would result from the execution of a received write request may be temporarily stored in protected restore map 107. In one exemplary scenario, three events may be assumed to occur in sequence. First, data is copied from clone 104 to source 102 as part of the protected restore operation. Second, data on source 102 is overwritten after the execution of the received write request. And third, data which was just written to source 102 is retrieved by the read request. If delta map 106, by itself, is used to determinate whether to redirect a read request during a protected restore operation, incorrect data may be returned. Continuing the example above, a read request to read data from source 102 should return data written by the write request in step two and not the data copied from clone 104 in step one. However, because examination of delta map 106 may result in redirecting the read request to read data from clone 104, examination of protected restore map 107 may prevent the undesired redirection of this read request during a protected restore operation.

Figure 1F:
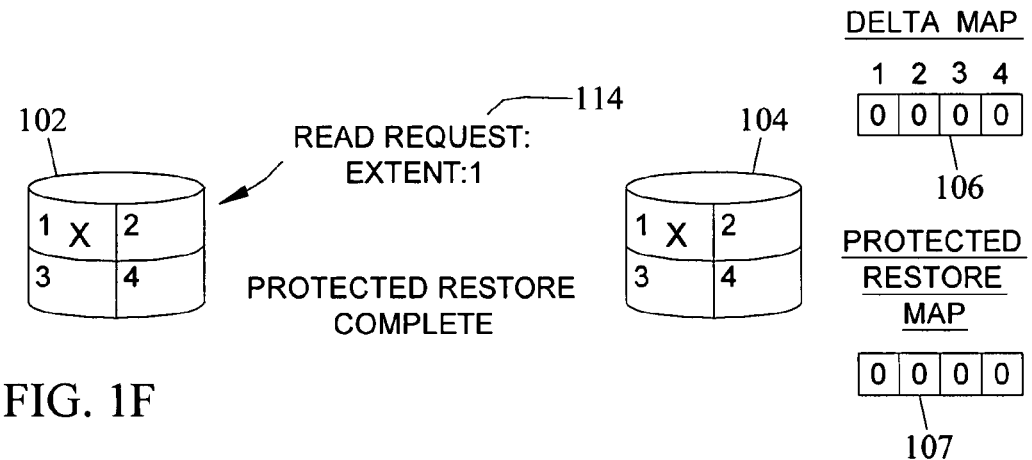

FIG. 1F illustrates data storage system 100 after completing the protected restore operation where another read request is received. Unlike the scenario illustrated in FIG. 1E, read request 114 is not redirected because no difference exists between source 102 and clone 104 with respect to the requested data. As described above, the protected restore operation initiated in FIG. 1E includes copying data X from clone 104 to source 102 and clearing the corresponding bits in delta map 106. Therefore, both source 102 and clone 104 contain data X and the first bit in delta map 106 is 0 indicating that source 102 and clone 104 are the same.

Read request 114 is then received for reading the first extent on source 102. Because the requested data is the same whether it is read from source 102 or clone 104 (i.e. data X), redirection of read request 114 is not necessary. Read request 114 may be immediately processed by source 102 and data content X may be retrieved from the first extent of source 102 via conventional methods.

Figure 2A:
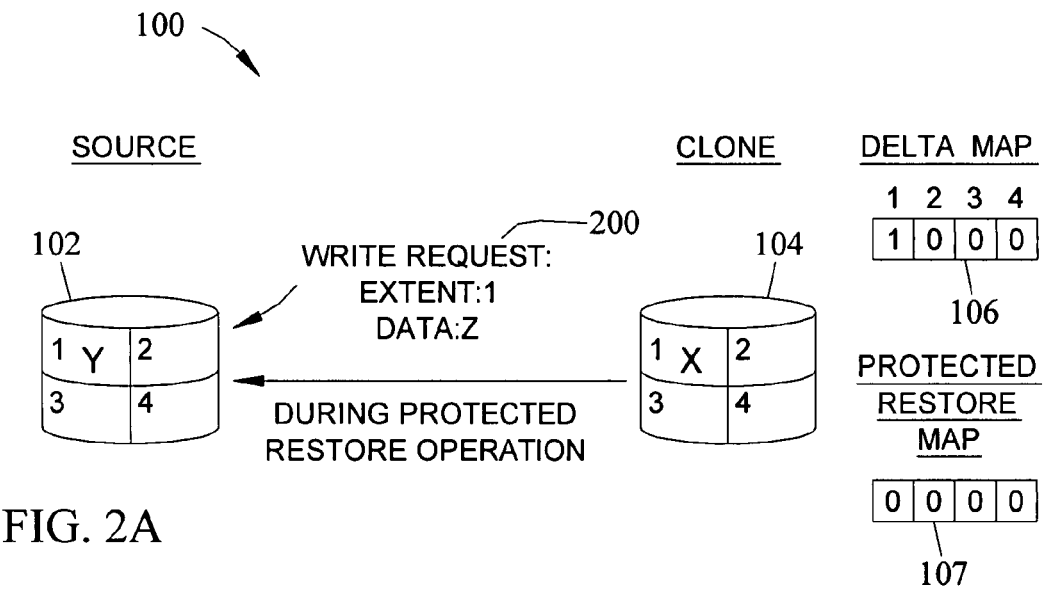
FIGS. 2A-2C are diagrams of different states of an exemplary data storage system for processing read requests received during a protected restore operation according to an embodiment of the subject matter described herein.
Figure 2B:
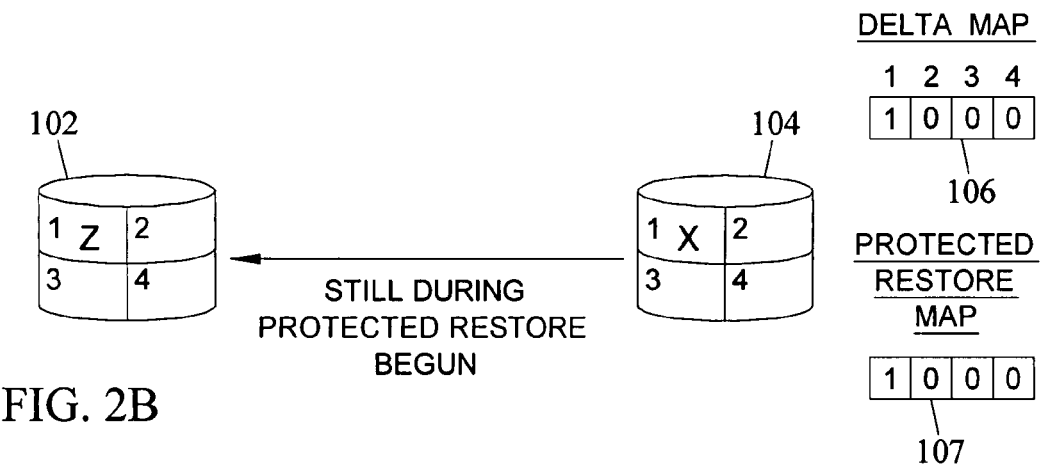
Figure 2C:
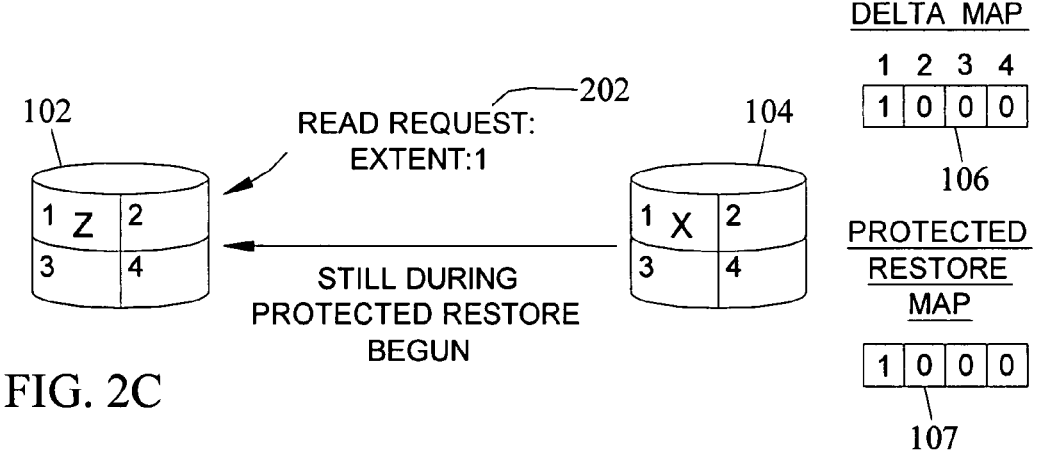

FIGS. 2A-2C are diagrams of different states of an exemplary data storage system for processing read requests received during a protected restore operation according to an embodiment of the subject matter described herein. In FIGS. 2A-2C, the determination of whether to redirect a read request to the clone includes examining a protected restore map used to track the extents on the source that have been modified during a protected restore operation. If a bit in protected restore map 107 is set (i.e. non-zero), a read request is not be redirected to the clone because the result of the redirected read request would not include the expected data.

For example, in FIG. 2A, a protected restore operation may be performed where data X is copied from clone 104 and to source 102 and overwrites existing data Y located on source 102. Because, initially, source 102 and clone 104 contain different data, the first bit in delta map 106 is set indicating that the first extents of source 102 and clone 104 are different. Protected restore map 107 initially contains no set bits, indicating that no write requests to source 102 have been processed during the protected restore operation. However, in the scenario illustrated in FIG. 2A, write request 200 to write data Z to source 102 is then received during the protected restore operation which, as described in greater detail below, may affect the processing of any future received read requests to read data from source 102. During the protected restore operation, data X may be written to source 102 and data Y may be overwritten prior to executing write request 200.

FIG. 2B illustrates the exemplary system after write request 200 is processed and protected restore map 107 has been updated. For example, processing write request 200 may include writing data Z to source 102 and setting a bit corresponding to altered extent number 1 in protected restore map 107. It is appreciated in this scenario that the user may perceive that data X was written to source 102 during the protected restore operation and that, subsequently, data Z was written pursuant to write request 200. Therefore, the expected result of any subsequently received read request directed to the first extent of source 102 would include data Z. However, if the determination regarding whether to redirect received read requests was solely based on an examination of delta map 106, read requests directed to the first extent on source 102 would be redirected to read data X from clone 104. Yet because the result of redirecting a read request in such a scenario would be undesirable as failing to return the expected data (data Z), protected restore map 107 may also be examined to determine whether to redirect read requests. Specifically, if an extent is changed as the result of a write request during a protected restore operation and a corresponding bit in the protected restore map is set, a read request directed to that extent is not redirected to the clone.

FIG. 2C illustrates a scenario in which a received read request is not redirected based on an examination of protected restore map 107. In this scenario, read request 202 is received where read request 202 is directed to the first extent of source 102. Because the first extents of source 102 and clone 104 are different (data Z and data X, respectively), the first bit in delta map 106 is set. Accordingly, if delta map 106 were the sole basis for determining whether to redirect read request 202, the determination would result in redirecting read request 202 to read data X from clone 104. However, as indicated above, this result is undesired. Therefore, protected restore map 107 may be examined to determine whether to redirect read request 202. In this case, protected restore map 107 contains a set bit indicating that the data located on the first extent of source 102 was changed pursuant to write request 200 during the protected restore operation. Accordingly, read request 202 is not redirected in FIG. 2C and data Z is returned.

Figure 3:
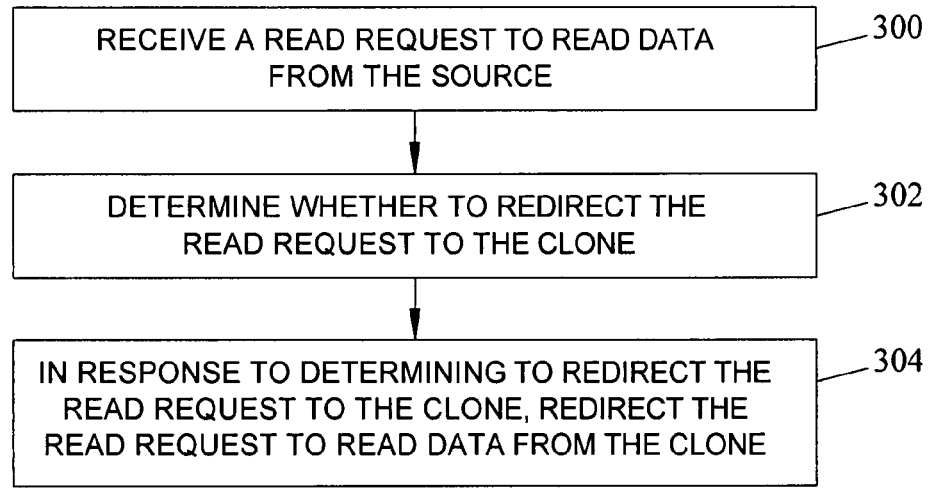
FIG. 3 is a flow chart of an exemplary process for processing read requests received during a protected restore operation according to an embodiment of the subject matter described herein.

FIG. 3 is a flow chart of exemplary steps for processing read requests received during a protected restore operation according to an embodiment of the subject matter described herein. Referring to FIG. 3, in block 300, a read request to read data from the source may be received during a protected restore operation. For example, read request 112 may be received where read request 112 requests to read data content from the first extent of source 102.

In block 302, it is determined whether to redirect the read request to the clone. Because data Y on source 102 is not desired, it is determined whether the desired data is located on clone 104 so that the read request may be immediately processed (i.e. redirected) rather than queued. For example, delta map 106 may be examined for any non-zero bits and a read request directed to an extent corresponding to one of these bits may be redirected to the clone.

In block 304, in response to determining that the read request should be redirected, the read request is redirected to the clone. As described above, a read request received during a protected restore operation may be redirected from source 102 to clone 104 by passing the read request from a redirector object in the source read stack to a data retrieval object in the clone read stack. However, it is appreciated that other suitable methods for redirecting a read request to a clone for processing may be implemented without departing from the scope of the subject matter described herein. By redirecting certain read requests received during a protected restore operation to clone 104, read requests may be processed quicker by avoiding the time associated with queuing read requests in conventional data storage systems.

Figure 4:
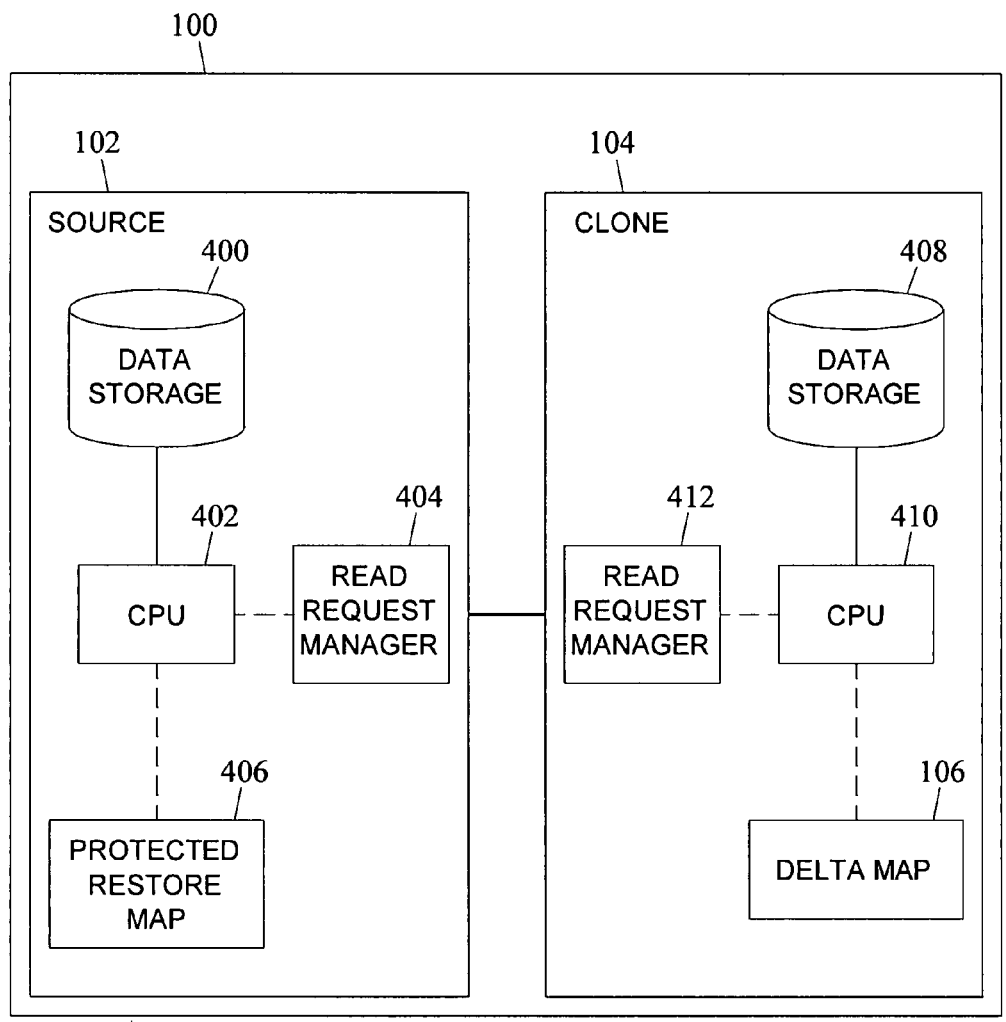
FIG. 4 is an internal architecture diagram of exemplary data storage system for processing read requests received during a protected restore operation according to an embodiment of the subject matter described herein.

FIG. 4 is a diagram of an exemplary internal architecture of a data storage system for processing read requests received during a protected restore operation according to an embodiment of the subject matter described herein. Referring to FIG. 4, data storage environment 100 may include source 102 and one or more clones 104 connected by a communications path such as an internal communications bus or Ethernet link. Data storage system 100 may receive commands, such as read and write requests, via any suitable computer interface, such as a graphical user interface (GUI) or command line interface (CLI). It is appreciated that the interface includes means for communicating with data storage system 100 through user or computer-generated commands, and may be operated remotely via a suitable network connection, such as a local area network (LAN) or the Internet.

Source 102 may include central processing unit (CPU) 402 for executing program logic stored in computer readable medium. Program logic executed by CPU 402 may include computer executable instructions for reading and writing data to data storage, receiving read and write requests, maintaining delta map 106 and protected restore map 406, and performing protected restore operations between clone 104 and source 102. For example, CPU 402 may execute instructions associated with read request manager 404 and examine delta map 106 and protected restore map 406. Read request manager 404 may receive read requests directed to source 102 redirect the read requests to clone 104. It is appreciated that program logic executed by CPUs 402 and 410, including read request managers 404 and 412, delta map 106, and protected restore map 406 may operate in conjunction with an operating system (not shown) also associated with data storage system 100.

It is appreciated that while delta map 106 and protected restore map 406 are bitmaps, other data structures may be used without departing from the subject matter described herein. It is further appreciated that delta map 106 and protected restore map 406 may be located in a computer readable memory, such as random access memory (RAM), or any other suitable medium without departing from the scope of the subject matter described herein.

One commercially available example of a data storage system suitable for implementing the subject matter described herein is the CLARiiON® disk array platform available from EMC Corporation of Hopkinton, Mass. However, the subject matter described herein is not limited to the CLARiiON® platform. The methods described herein for processing read requests can be implemented on any platform that includes a disk array without departing from the scope of the subject matter described herein.

It is further appreciated that source 102 and clone 104 may include read stacks for reading data from data storage devices 400 and 408. The source and clone read stacks, which are discussed in greater detail below, may be managed, for example, by read request managers 404 and 412. Each read stack may also include a plurality of objects for processing received read requests.

Figure 5:
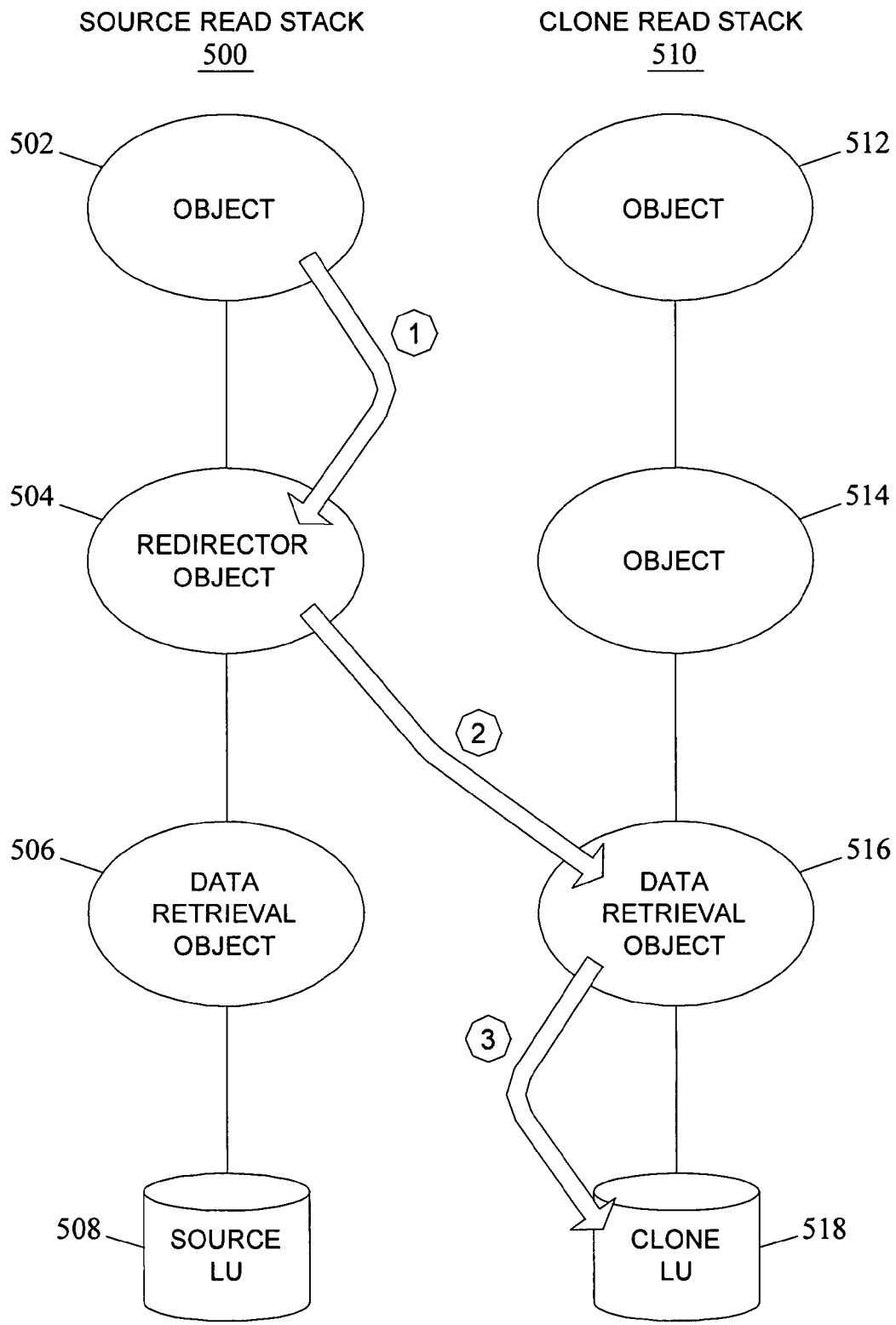
FIG. 5 is a diagram of source and clone read stack for redirecting, during a protected restore operation, a read request directed to a source to read data from a clone according to an embodiment of the subject matter described herein.

FIG. 5 is a diagram of an exemplary source read stack and clone read stack for redirecting, during a protected restore operation, a read request from a source to a clone according to an embodiment of the subject matter described herein. Referring to FIG. 5, source read stack 500 may include an object 502 for performing various processing function related to a received read request, a redirector object 504 for determining whether to redirect a read request received during a protected restore operation, and a data retrieval object 506 for reading data from source logical unit (LU) 508, where a logical unit is a logical partition of data stored on a physical disk device. Source data retrieval object 506 may read data stored in a variety of formats and/or physical data storage locations, including but not limited to, a single disk storage device, a disk array including multiple disk storage devices, and a local area network.

Clone read stack 510 may similarly include objects 512 and 514 for performing various functions associated with processing read requests. For example, as indicated above, objects 502, 512, and 514 may generate statistics associated with a read request or other functions unrelated to the redirection of read requests as described herein. Clone read stack 510 may also include data retrieval object 516 for reading data from clone LU 518. It is appreciated that, like source data retrieval object 506, clone data retrieval object 516 may read data stored in a variety of formats and/or physical data storage locations.

In order to illustrate redirecting a read request received during a protected restore operation, a read request may be received requesting data located on source LU 508. This read request may be processed initially by the first object in source read stack 500, such as object 502. After processing is performed by object 502, redirector object 504 may determine whether to redirect the read request to read data from clone 518. Here, it is assumed that redirector object 504 determines to redirect the read request to the clone. Accordingly, redirector object 504 may pass the read request to clone data retrieval object 516, for example, by modifying the stack pointer rather than processing the read request using the next object in source read stack 500 (i.e. source data retrieval object 506). Clone data retrieval object 516 may then process the read request by retrieving data located in the appropriate extent on clone LU 516 and returning the result.

It will be understood that various details of the subject matter described herein may be changed without departing from the scope of the subject matter described herein. Furthermore, the foregoing description is for the purpose of illustration only, and not for the purpose of limitation.

What is claimed is:

1. A method for processing read requests received during a protected restore operation, the method comprising:
   in a data storage system having a first portion of data denominated as a source and at least a second portion of data denominated as a clone, wherein the clone receives data from the source through synchronous mirroring until fracturing occurs after which the clone has data content that is a point-in-time copy of data content of the source and during a protected restore operation that includes copying at least a portion of the data content of the clone to the source, wherein during the protected restore operation the data content of the clone is prevented from being modified:
   receiving a read request to read data from the source;
   determining whether to redirect the read request to the clone, wherein determining whether to redirect the read request to the clone includes determining whether the read request requests data that has yet to be copied from the clone to the source; and
   in response to determining to redirect the read request to the clone, redirecting the read request to read the data from the clone via a stack on the clone, wherein data is read from the source for a subsequent read request during the protected restore operation.

2. The method of claim 1 wherein redirecting the read request includes reading data from the clone indicated by the read request.

3. The method of claim 1 wherein determining whether to redirect the read request to the clone includes examining one or more data structures associated with at least one of the source and the clone.

4. The method of claim 3 wherein examining the one or more data structures includes examining a bitmap including a representation of extents located on the source and on the clone, wherein the bitmap indicates whether data content of the source is different from corresponding data content of the clone.

5. The method of claim 3 wherein examining the one or more data structures includes examining a bitmap including a representation of extents located on the source and on the clone, wherein the bitmap indicates extents on the source modified during the protected restore operation.

6. The method of claim 5 wherein the read request corresponds to an extent that was modified during the protected restore operation and wherein the method further comprises refraining from redirecting the read request to the clone.

7. The method of claim 1 wherein redirecting a read request to read data from the clone includes using a redirector object in a read stack associated with the source to communicate with a data retrieval object in a clone read stack configured to read data content of the clone.

8. The method of claim 1 wherein the source and the clone are located on one of a single disk storage device, different disk storage devices within a disk array, different disk arrays, a single local area network (LAN), and different LANs.

9. A system for processing read requests received during a protected restore operation, the system comprising:
   a data storage system comprising one or more physical data storage devices, the data storage system including a first portion of data denominated as a source and a second portion of data denominated as a clone, wherein the clone receives data from the source through synchronous mirroring until fracturing occurs after which the clone has data content that is a point-in-time copy of data content of the source; and
   a read request manager for receiving a read request to read data from the source, for determining whether to redirect the read request to the clone, wherein determining whether to redirect the read request to the clone includes determining whether the read request requests data that has yet to be copied from the clone to the source and, in response to determining to redirect the read request to the clone, for redirecting the read request to read data from the clone via a stack on the clone during a protected restore operation, wherein data is read from the source for a subsequent read request during the protected restore operation, wherein during the protected restore operation the data content of the clone is prevented from being modified.

10. The system of claim 9 wherein the read request manager is configured to, in response to determining to redirect the read request to the clone, execute the read request, wherein executing the read request includes reading data from the clone indicated by the read request.

11. The system of claim 9 wherein the read request manager is configured to determine whether to redirect the read request to the clone by examining one or more data structures associated with at least one of the source and the clone.

12. The system of claim 11 wherein the read request manager is configured to examine a bitmap including a representation of extents located on the source and on the clone, wherein the bitmap indicates whether data content of the source is different from corresponding data content of the clone.

13. The system of claim 11 wherein the read request manager is configured to examine a bitmap including a representation of extents located on the source and on the clone, wherein the bitmap indicates extents on the source that were modified during the protected restore operation.

14. The system of claim 13 wherein the read request manager is configured to refrain from redirecting the read request to the clone in response to the read request being directed to a data storage extent of the source that was modified during the protected restore operation.

15. The system of claim 9 wherein the read request manager is configured to utilize a redirector object in a read stack associated with the source to communicate with a data retrieval object in a clone read stack configured to read data content from the clone.

16. The system of claim 9 wherein the source and the clone are located on one of a single disk storage device, different disk storage devices within a disk array, different disk arrays, a single local area network (LAN), and different LANs.

17. A computer program product comprising computer executable instructions embodied in a non-transitory computer readable medium for performing steps comprising:
in a data storage system having a first portion of data denominated as a source and at least a second portion of data denominated as a clone, wherein the clone receives data from the source through synchronous mirroring until fracturing occurs after which the clone has data content that is a point-in-time copy of data content of the source and during a protected restore operation that includes copying at least a portion of the data content of the clone to the source, wherein during the protected restore operation the data content of the clone is prevented from being modified:
receiving a read request to read data from the source;
determining whether to redirect the read request to the clone, wherein determining whether to redirect the read request to the clone includes determining whether the read request requests data that has yet to be copied from the clone to the source; and
in response to determining to redirect the read request to the clone, redirecting the read request to read the data from the clone via a stack on the clone, wherein data is read from the source for a subsequent read request during the protected restore operation.

* * * * *